United States Patent
Reichensperger et al.

(10) Patent No.: US 11,827,332 B2
(45) Date of Patent: Nov. 28, 2023

(54) FOREIGN OBJECT IMPACT PROOF WINDSHIELD ASSEMBLY

(71) Applicant: AIRBUS HELICOPTERS DEUTSCHLAND GMBH, Donauworth (DE)

(72) Inventors: Christian Reichensperger, Baeumenheim (DE); Mikko Schnizer, Augsburg (DE); Lars Wolters, Hamburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 342 days.

(21) Appl. No.: 16/594,343

(22) Filed: Oct. 7, 2019

(65) Prior Publication Data
US 2020/0180748 A1 Jun. 11, 2020

(30) Foreign Application Priority Data
Dec. 11, 2018 (EP) .................................... 18400036

(51) Int. Cl.
*B64C 1/14* (2006.01)
*B60J 1/20* (2006.01)

(52) U.S. Cl.
CPC ........... *B64C 1/1484* (2013.01); *B60J 1/2094* (2013.01); *B64C 1/1492* (2013.01)

(58) Field of Classification Search
CPC ..... B64C 1/1492; B64C 1/1484; B64C 1/484; B60J 1/2094

(Continued)

(56) References Cited

U.S. PATENT DOCUMENTS 2,392,129 A * 1/1946 Downes ............ B32B 17/10293
52/208
2,398,886 A * 4/1946 Drake ............... B32B 17/10036
52/208

(Continued)

FOREIGN PATENT DOCUMENTS

DE 19921871 A1 11/1999
DE 102011081784 A1 3/2012

(Continued)

OTHER PUBLICATIONS

European Search Report for European Application No. EP 18400036, Completed by the European Patent Office, dated Jun. 3, 2019, 8 pages.

*Primary Examiner* — Christopher D Hutchens
(74) *Attorney, Agent, or Firm* — Brooks Kushman P.C.

(57) ABSTRACT

A vehicle with a vehicle frame and a windshield assembly that is mounted to the vehicle frame and closes an associated opening provided in the vehicle frame. The windshield assembly comprises at least one flexible element and at least one windshield. The at least one flexible element connects the at least one windshield to the vehicle frame for at least partially absorbing loads resulting from an impact on the at least one windshield. The at least one flexible element connects the at least one windshield to the vehicle frame such that the at least one windshield pivots relative to the vehicle frame by means of the at least one flexible element upon occurrence of an impact on the at least one windshield such that the at least one flexible element defines a hinge element.

20 Claims, 5 Drawing Sheets

(58) Field of Classification Search
USPC .................................................... 296/96.22
See application file for complete search history.

(56) References Cited

U.S. PATENT DOCUMENTS

| | | | | |
|---|---|---|---|---|
| 2,403,060 | A | * | 7/1946 | Downes ............ B32B 17/10036 |
| | | | | 52/208 |
| 2,679,467 | A | * | 5/1954 | Sherts ........................ E06B 5/12 |
| | | | | 49/141 |
| 2,784,926 | A | | 3/1957 | Bonza et al. |
| 4,204,374 | A | * | 5/1980 | Olson ..................... B32B 27/08 |
| | | | | 244/121 |
| 4,650,240 | A | * | 3/1987 | Rinella .................... B60J 10/70 |
| | | | | 296/93 |
| 6,193,304 | B1 | | 2/2001 | Takahashi et al. |
| 10,577,075 | B1 | * | 3/2020 | Pak ......................... B64D 7/00 |
| 2003/0227191 | A1 | * | 12/2003 | Okamoto ................. B60J 10/70 |
| | | | | 296/96.22 |
| 2012/0056446 | A1 | | 3/2012 | Stojkovic et al. |
| 2015/0232169 | A1 | | 8/2015 | Markmiller |
| 2016/0031544 | A1 | * | 2/2016 | Coraboeuf ............. B64D 15/00 |
| | | | | 244/129.3 |
| 2017/0144709 | A1 | | 5/2017 | Nakashima |
| 2018/0201358 | A1 | * | 7/2018 | Wall ...................... B64C 1/1492 |

FOREIGN PATENT DOCUMENTS

| | | |
|---|---|---|
| EP | 1518780 A1 | 3/2005 |
| EP | 2907744 A1 | 8/2015 |
| EP | 3056412 A1 | 8/2016 |
| EP | 3100947 A1 | 12/2016 |
| JP | 2008100533 A | 5/2008 |
| WO | 2014183614 A1 | 11/2014 |
| WO | 2015152096 A1 | 10/2015 |

* cited by examiner

FOREIGN OBJECT IMPACT PROOF WINDSHIELD ASSEMBLY

CROSS-REFERENCE TO RELATED APPLICATIONS

This application claims priority to European patent application No. EP 18400036.2 filed on Dec. 11, 2018, the disclosure of which is incorporated in its entirety by reference herein.

BACKGROUND OF THE INVENTION

(1) Field of the Invention

The invention is related to a vehicle with a vehicle frame and a windshield assembly that is mounted to the vehicle frame, the windshield assembly comprising at least one windshield and at least one flexible element.

(2) Description of Related Art

Vehicle frames can be provided with one or more windshields that are configured to embody aerodynamically formed windows e. g. on a given front of corresponding vehicles. The windshields are provided in order to protect occupants of the corresponding vehicles from wind and potentially flying debris, such as insects and dust.

In order to allow for an easy replacement of a windshield that is damaged or broken, the windshield can e. g. be mounted to an associated vehicle frame via a mounting structure. Such a mounting structure does not only allow for a quick and easy exchange of a damaged or broken windshield, but also enables a required compatibility between the associated vehicle frame and specific material properties of the windshield, as well as a transfer of loads between the windshield and the associated vehicle frame in operation of an underlying vehicle.

However, depending on an underlying application of a given windshield, i. e. an associated vehicle frame, different maximum load requirements are applied to the windshield. Therefore, or in addition, specific geometric constraints must be considered when designing the windshield and an associated mounting structure.

For instance, if a given vehicle frame defines an airframe of a helicopter, the maximum applicable load requirements are very high if the helicopter has a maximum takeoff weight of more than 3.175 kg, as the windshield of such a helicopter must be able to sustain a foreign object impact, such as e. g. a bird strike. Furthermore, a minimum available area of visibility for a pilot of the helicopter must be provided and, thus, represents an important geometric constraint for the design of the windshield and associated mounting means, such as an associated mounting structure.

More generally, requirements on windshields are manifold. Accordingly, windshields with many different materials and configurations are known from the prior art. One such windshield is a polycarbonate windshield which is considerably lighter than the conventional wide spread multilayer foreign object impact proof windshields. Such a polycarbonate windshield advantageously offers a higher degree of freedom than the wide spread multilayer foreign object impact proof windshields with respect to an underlying geometry of the windshield, and in particular its curvature. An exemplary vehicle with a polycarbonate windshield is described hereinafter.

Document US 2015/0232169 A1 describes a windshield mounting assembly that is adapted to be arranged on an associated vehicle frame. The windshield mounting assembly comprises a mounting frame that is attached to a windshield and adapted for mounting the windshield to the associated vehicle frame. The mounting frame comprises at least one fastener receiving opening that is provided to receive associated frame fasteners and a bonding interface arranged between the windshield and the mounting frame. Very high loads can be transferred from the mounting frame via the frame fasteners to the vehicle frame. The windshield can be made of any transparent material including glass and polymers, such as e. g. polymethyl methacrylate and polycarbonate.

However, in such a windshield mounting assembly loads applied to the windshield are transferred from the windshield to the vehicle frame via the fasteners. Furthermore, the windshields must be able to withstand strong external impacts, in particular foreign object impacts. Moreover, windshield mounting assemblies with mounting frames and fasteners usually have a comparatively high weight. As a result, technical innovations with respect to suitable windshield mounting assemblies are mainly related to an underlying strength and weight of the windshield and mounting thereof.

In this respect an important issue arises concerning polycarbonate as a selected windshield material, as polycarbonate is a highly resistant material but has to face some challenges. More specifically, polycarbonate is generally ductile but can brittle suddenly depending on a respective strain rate. In fact, a three-dimensional stress state with high strains can lead to a sudden brittle failure of a polycarbonate windshield without absorbing a lot of energy. Furthermore, polycarbonate windshields are extremely sensitive to notches and bored holes. Moreover, cold temperatures also have a negative impact on an underlying failure behavior of polycarbonate windshields.

Another aspect that must be considered in the development of windshield mounting assemblies consists in the capability of the windshield mounting assemblies to absorb energy in case of an impact on a respective windshield, such as a foreign object impact. This aspect is particularly relevant in the automotive industry and exemplary energy absorbing structures are described in the following documents: EP 3 056 412 A1, EP 1 518 780 A1, DE 19 921 871 A1, WO 2015/152096 A1, DE 10 2011 081 784 A1, JP 2008100533 A, and U.S. Pat. No. 6,193,304 B1. These documents respectively describe an energy absorbing structure or cowl that takes loads by compression via respective windshields. More specifically, the purpose of these energy absorbing structures is to protect pedestrians from hitting structural members of respective automobiles.

Furthermore, document U.S. Pat. No. 6,193,304 B1 describes a windshield support of an automobile that is formed as a cantilever-like or overhang support including a bend portion, a box portion and a flange portion which are formed continuously in that order. The bend portion is extended from an instrument panel upper portion and has a substantially V-shaped cross section. The box portion has a hollow rectangular cross section and is sufficiently disposed away from the instrument panel upper portion. The flange portion receives a windshield. A recessed portion is provided at the instrument panel upper portion for receiving a lower portion of the box portion when the bend portion has to be bent by virtue of an external force applied to the windshield.

In this configuration, the bend portion absorbs loads that occur e. g. as a result of foreign object impacts on the windshield. However, the degree of freedom of the bend portion is only translational, and no rotational freedom is provided.

However, the geometry of windshield mounting assemblies from the automotive industry is generally not adaptable to helicopters as respective boundary conditions and requirements are completely different. In fact, integrating a windshield mounting assembly into a helicopter is a very complex task because of the specific geometric constraints and load requirements.

BRIEF SUMMARY OF THE INVENTION

It is, therefore, an object of the present invention to provide a vehicle that overcomes the above-described drawbacks and that is provided with an improved windshield assembly that is suitable to absorb at least partially loads resulting from an impact on an associated windshield, in particular resulting from a foreign object impact, such as a bird strike.

This object is solved by a vehicle comprising a windshield assembly mounted to a vehicle frame and comprising at least one flexible element, said vehicle comprising the features of claim 1.

More specifically, according to the present invention a vehicle with a vehicle frame and a windshield assembly is provided. The windshield assembly is mounted to the vehicle frame and closes an associated opening provided in the vehicle frame. The windshield assembly comprises at least one flexible element and at least one windshield. The at least one flexible element is attached to the at least one windshield and connects the at least one windshield to the vehicle frame for at least partially absorbing loads resulting from an impact on the at least one windshield, in particular resulting from a foreign object impact. The at least one flexible element connects the at least one windshield to the vehicle frame such that the at least one windshield pivots relative to the vehicle frame by means of the at least one flexible element upon occurrence of an impact on the at least one windshield such that the at least one flexible element defines a hinge element. The at least one flexible element is a plate-type element with a picture frame-like shape, which comprises an inner opening. The at least one windshield and the vehicle frame are arranged on opposite surfaces of the at least one flexible element.

It should be noted that the term "plate-type" refers in the context of the present invention to an at least essentially flat structure that may have a slight curvature. By way of example, such a flat structure may be obtained from a sheet metal. The term "flexible" used in the expression "flexible element" should be understood such that reference is made to an element that may at least be flexed. More specifically, the flexible element may at least be plastically deformable. Preferably, the flexible element is at least within predetermined tolerances non-destructively plastically deformable. Furthermore, or alternatively, the flexible element may be elastically deformable within a predetermined range or degree of flexure.

Advantageously, the flexible element permits to transfer loads from the windshield to the cabin frame. More particularly, the flexible element permits to reduce loads on the windshield, which occur in response to an impact on the windshield, in particular resulting from a foreign object impact such as a bird strike. By reducing the loads on the windshield, breakage of the windshield may at least in a wide range be restricted to excessive load cases.

According to one aspect, the flexible element may be implemented as an energy absorbing element. However, such an implementation is not mandatory, as the main function of the flexible element consists in the load transfer to the vehicle frame.

In any case, the flexible element permits to relieve the windshield, but also the vehicle frame. In other words, in case of a foreign object impact the windshield advantageously bends three-dimensionally towards a respective vehicle interior and, thereby, the flexible element to which the windshield is attached follows the movement of the windshield and preferably deforms plastically.

According to one aspect, in non-excessive load cases occurring during foreign object impact, the windshield bends first inwardly, and, because of its flexibility, then back outwardly without breaking. The flexible element follows the movement and thereby absorbs the impact energy of the foreign object impact so that the vehicle frame will not be damaged.

Moreover, the at least one flexible element can barely transmit a moment. Therefore, the inventive windshield assembly does not transfer a respective peeling load to the cabin frame.

Advantageously, the inventive windshield assembly can be applied to a wide range of vehicles including, but not being limited to, helicopters, aircrafts, cars, and vessels. Furthermore, as the inventive windshield assembly is attached to an associated vehicle frame, the windshield assembly can easily be replaced if necessary. Moreover, the inventive windshield assembly does not interfere with an underlying required area of visibility and is more compact compared to conventional mounting frame designs.

Preferably, the at least one windshield of the inventive windshield assembly is provided with an outer circumference that is smaller than or equal to an inner circumference of the associated opening of the vehicle frame such that the at least one windshield is arranged on the vehicle without overlapping the vehicle frame.

Alternatively, the at least one windshield may overlap the vehicle frame in a respective overlap region without being attached to the at least one flexible element and/or the vehicle frame in the respective overlap region.

Preferably, the inner opening has a circumference that is smaller than an outer circumference of the at least one windshield. The at least one flexible element has an outer circumference that is greater than an inner circumference of the associated opening of the vehicle frame.

Preferably, the at least one flexible element comprises a fiber reinforced polymer and/or metal.

Preferably, the at least one flexible element is bonded to the vehicle frame by means of at least one adhesive layer.

Preferably, the at least one flexible element is attached to the vehicle frame by means of at least one fastener. By way of example, the fasteners may be embodied as screws, bolts or rivets.

Preferably, the at least one windshield is bonded to the at least one flexible element by means of at least one adhesive layer.

Advantageously, the use of an adhesive layer reduces weight and complexity of the windshield assembly. Furthermore, notches which might trigger a brittle failure may at least be reduced or even completely avoided.

According to one aspect, use of an additional adhesive layer may add softness to the windshield assembly. In this case, the respective two adhesive layers act mechanically as two springs in series. By way of example, at least one of the two adhesives layers and, preferably, both adhesive layers may be embodied by means of soft glues, such as polyurethane (PU) glues.

Moreover, the integration of the windshield into the windshield assembly is generally lighter and cheaper than in conventional assemblies, due to the fact that the windshield assembly as a whole comprises less parts and requires no complex integration steps. In fact, a respective integration method is fully retrofittable.

Preferably, the at least one windshield comprises thermoplastic material, in particular polycarbonate.

Advantageously, windshield assemblies according to the present invention may be provided with windshields that can be made of any transparent material that is suitable for manufacturing windshields. This includes e. g. glass, laminated glass, and polymers, such as e. g. polymethyl methacrylate (PMMA) and polycarbonate (PC).

Advantageously, the windshield assembly exhibits improved characteristics and properties in terms of weight and strength if the windshield comprises PC. In fact, PC is lighter than e. g. herculite glass, and also advantageous with respect to an achievable curvature. Furthermore, PC is stronger and cheaper than PMMA that requires a greater thickness to obtain a similar resistance. However, as the windshield assembly requires high strength in order to resist loads caused by an impact, in particular a foreign object impact, PC windshields are preferred.

With respect to such PC windshields, the flexible element advantageously changes a respective bending line of the PC windshield in the inventive windshield assembly. Thus, respective strains and a given thread of a PC's brittle failure are reduced. Moreover, a PC windshield has the ability to deform without too high loads and strains. The flexible element preferably absorbs energy as described above in order to unload the windshield itself.

Preferably, the at least one windshield has a curvature in at least one direction.

This curvature is due to a generally excellent formability of the PC polymer material that is preferably used to implement the windshield.

Preferably, the vehicle frame comprises composite material, in particular fiber reinforced polymer material.

Advantageously, the vehicle frame is carrying the global loads transferred from the windshield.

Preferably, the vehicle is embodied as a helicopter.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
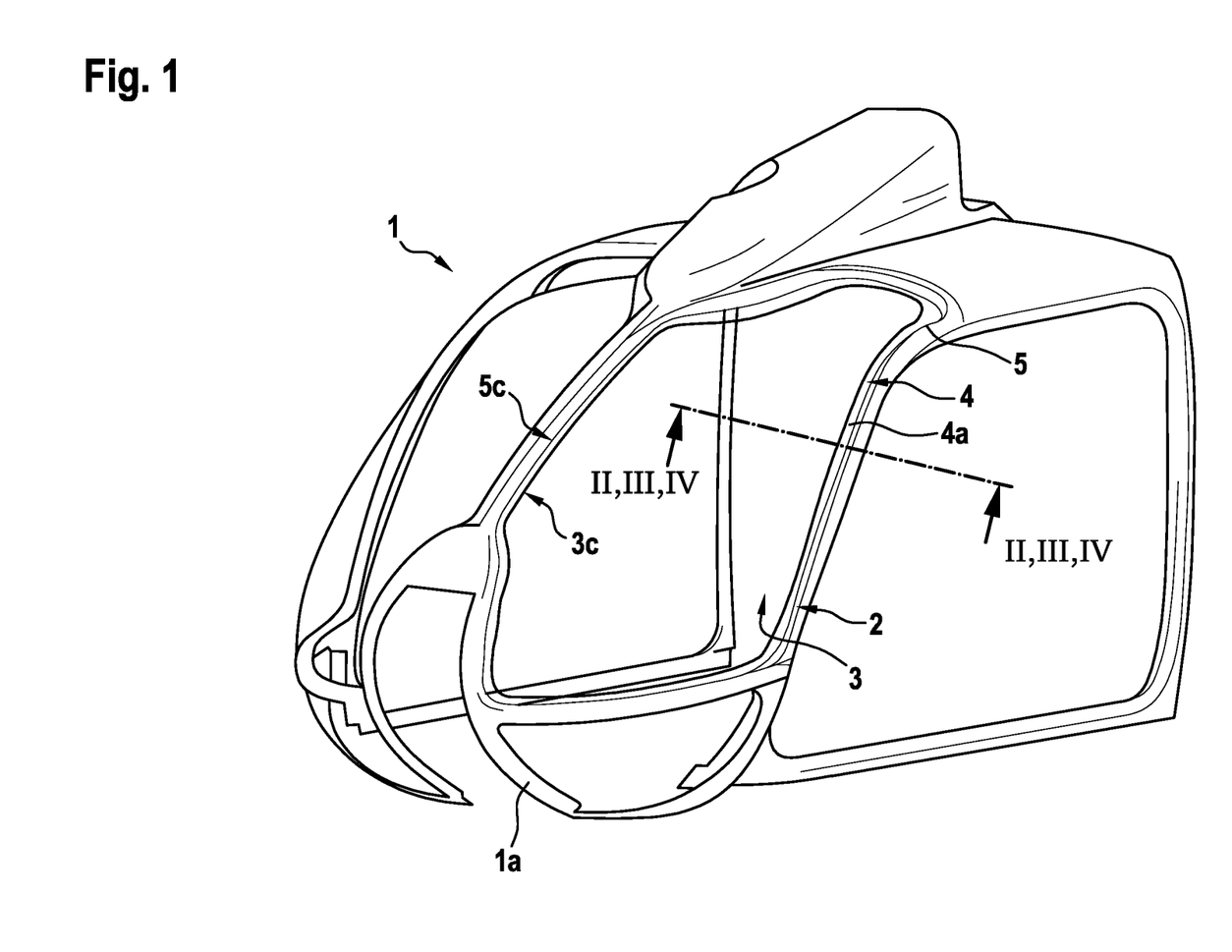
FIG. 1 shows a perspective view of a vehicle with a windshield assembly according to the invention.

FIG. 1 shows an exemplary vehicle frame 1a of a vehicle 1 with a windshield assembly 2 according to the present invention. The vehicle frame 1a preferably, but not necessarily, comprises a composite material, preferentially a fiber reinforced polymer material, such as carbon fiber reinforced polymer and/or glass fiber reinforced polymer.

By way of example, the vehicle frame 1a is embodied as an airframe of a helicopter. However, only a segment of a fuselage of a helicopter, which illustratively represents a cockpit frame of the helicopter, is shown. The helicopter is, nevertheless, not shown in greater detail for simplicity and clarity of the drawings.

It should be noted that the present invention is not limited to mounting of the inventive windshield assembly 2 to the cockpit frame of a helicopter. Instead, the inventive windshield assembly 2 can be mounted to multiple different frame structures, such as e. g. frame structures of aircrafts in general, frame structures of cars, frame structures of vessels, and so on.

Illustratively, the windshield assembly 2 comprises at least one windshield 3. In the following, reference is made to a single windshield, for simplicity and ease of the description. However, it is clear that the vehicle frame 1a may be provided with multiple different windshields and windshield assemblies, so that configurations with more than one windshield are likewise contemplated.

The windshield 3 is preferably embodied by means of a transparent, light-permeable material. Advantageously, the windshield 3 comprises a thermoplastic material. By way of example, the windshield 3 comprises polycarbonate.

Preferably, the windshield 3 has a curvature in at least one direction. Preferentially the curvature is provided such that the windshield 3 exhibits an aerodynamic shape.

Furthermore, the windshield 3 illustratively comprises an outer circumference 3c. This outer circumference 3c is defined by an outer contour of the windshield 3 and is e. g. in the case of a rectangular base geometry of the windshield 3 schematically defined by an underlying windshield length and height (3a and 3b in FIG. 7).

The windshield assembly 2 preferably further comprises at least one flexible element 4 that is attached to the windshield 3. In the following, reference is made to a single flexible element, for simplicity and ease of the description. However, it is clear that the windshield assembly 2 may also be provided with more than one flexible element, so that configurations with two or more flexible elements are likewise contemplated.

According to one aspect, the flexible element 4 connects the windshield 3 to the vehicle frame 1a. The flexible element 4 preferably absorbs loads resulting from an impact on the windshield 3, in particular resulting from a foreign object impact, such as e. g. a bird strike.

Preferably, the windshield assembly 2 is mounted to the vehicle frame 1a and closes an associated opening 5 provided in the vehicle frame 1a. The opening 5 is illustratively provided with an opening inner circumference 5c. This opening inner circumference 5c is defined by the inner contour of the opening 5 and is e. g. in the case of a rectangular base geometry of the opening 5 defined by an underlying opening length and height (5a and 5b in FIG. 7).

According to one aspect, the outer circumference 3c of the windshield 3 is smaller than or equal to the inner circumference 5c of the opening 5 of the vehicle frame 1a. In other words, the windshield 3 is preferably arranged on the vehicle 1 without overlapping the vehicle frame 1a.

However, it should be noted that the windshield 3 may alternatively overlap the vehicle frame 1a. Nevertheless, in this case the windshield 3 is preferably neither directly nor indirectly attached to the vehicle frame 1a and/or the flexible element 4 in a respective overlap region (8c in FIG. 6), as described in more detail below with reference to FIG. 6.

The flexible element 4 is preferably embodied as a plate-type element 4a that may at least be flexed. By way of example, the flexible element 4 may be realized by using a fiber reinforced polymer, such as a carbon fiber reinforced polymer, a glass fiber reinforced polymer and/or an aramid fiber reinforced polymer, and/or by using a metal, such as aluminum.

More specifically, the flexible element 4 is preferably at least plastically deformable. Preferentially, the flexible element 4 is at least within predetermined tolerances non-destructively plastically deformable. Furthermore, or alternatively, the flexible element 4 may be elastically deformable within a predetermined range or degree of flexure.

In operation of the vehicle 1 and, more particularly, upon occurrence of an impact, e. g a foreign object impact such as a bird strike on the windshield 3, the windshield 3 pivots according to one aspect by means of the flexible element 4 relative to the vehicle frame 1a. In other words, the flexible element 4 functions as a hinge element upon occurrence of an impact. This functionality is described in more detail below with reference to FIG. 5.

Figure 2:
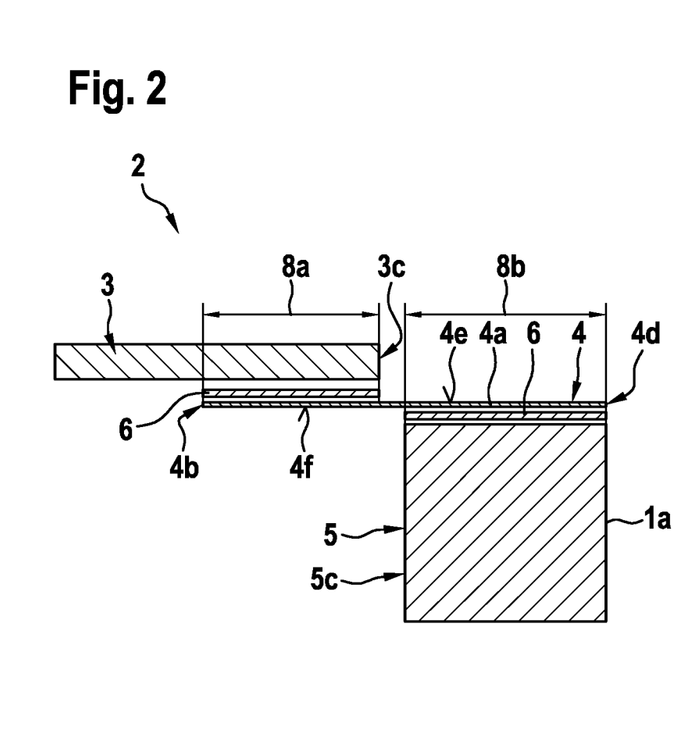
FIG. 2 shows a schematic view of a cross section along the cut line II-II of the vehicle of FIG. 1.

FIG. 2 shows the vehicle frame 1a of FIG. 1 and the windshield assembly 2 of FIG. 1 with the windshield 3 and the flexible element 4. The flexible element 4 is embodied as the plate-type element 4a of FIG. 1 and connects the windshield 3 to the vehicle frame 1a.

According to one aspect, the windshield 3 is bonded to a first surface 4e of the plate-type element 4a by means of at least one adhesive layer 6. The adhesive layer 6 is preferably at least partially realized by a soft glue, such as e. g. a PU glue.

Illustratively, the windshield 3 is bonded to the flexible element 4 in an area having a length 8a. This area, thus, defines an overlap area in which the windshield 3 and the flexible element 4 overlap. The overlap area is hereinafter referred to as the "overlap area 8a".

The flexible element 4, in turn, is according to one aspect bonded to the vehicle frame 1a by means of at least one other adhesive layer, which is also referred to with the reference sign 6, for simplicity and clarity. The other adhesive layer 6 is preferably also at least partially realized by a soft glue, such as e. g. a PU glue.

Illustratively, the flexible element 4 is bonded to the vehicle frame 1a in an area having a length 8b, which exemplarily corresponds to a width of the vehicle frame 1a. This area, thus, defines an overlap area in which the flexible element 4 and the vehicle frame 1a overlap. This overlap area is hereinafter referred to as the "overlap area 8b".

Between the overlap areas 8b and 8a, a free space of the flexible element 4 is preferably provided, i. e. a space that is neither bonded to the windshield 3 nor to the vehicle frame 1a. This free space of the flexible element 4 is preferably the portion that defines the hinge element as described above and that remains free to allow movement in every direction in order to allow absorption of loads resulting from an impact.

According to one aspect, the vehicle frame 1a and the windshield 3 are arranged on opposite surfaces 4f, 4e of the flexible element 4. By way of example, the surface 4f of the plate-type element 4a that implements the flexible element 4 is bonded to the vehicle frame 1a and the opposed surface 4e of the plate-type element 4a that implements the flexible element 4 is bonded to the windshield 3.

Illustratively, the plate-type element 4a that implements the flexible element 4 is formed as a plate and comprises an inner opening 4b and has an outer circumference 4d such that the flexible element 4 has a picture frame-like shape. Furthermore, the vehicle frame 1a preferably comprises an associated opening 5 with an opening inner circumference 5c. Moreover, the windshield 3 has a windshield outer circumference 3c.

According to one aspect, the windshield outer circumference 3c is smaller than or equal to the opening inner circumference 5c and the windshield 3 is preferably arranged by means of the plate-type element 4a on the vehicle frame 1a without overlapping the vehicle frame 1a. Thereby, the windshield 3 preferably hermetically closes the inner opening 4b of the plate-type element 4a.

Figure 3:
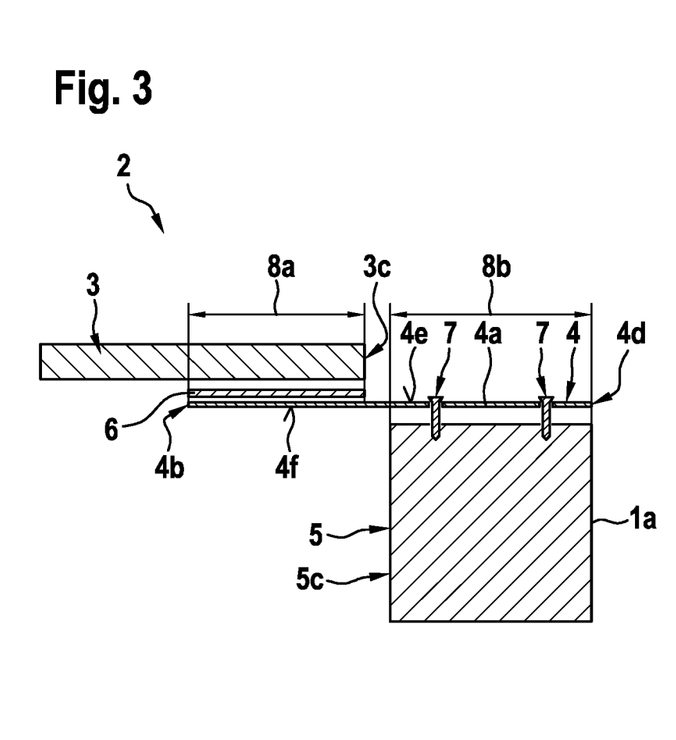
FIG. 3 shows a schematic view of a cross section along the cut line III-III of the vehicle of FIG. 1.

FIG. 3 shows the vehicle frame 1a of FIG. 2 and the windshield assembly 2 of FIG. 2 with the windshield 3 and the flexible element 4. As described above with reference to FIG. 2, the windshield 3 is preferably bonded to the surface 4e of the plate-type element 4a that implements the flexible element 4 by means of the adhesive layer 6.

However, in contrast to FIG. 2 the flexible element 4 is now attached to the vehicle frame 1a by means of at least one associated fastener 7, such as e. g. a screw, rivet or bolt. In other words, the at least one associated fastener 7 is used instead of the other adhesive layer 6 that attaches the flexible element 4 to the vehicle frame 1a according to FIG. 2.

Figure 4:
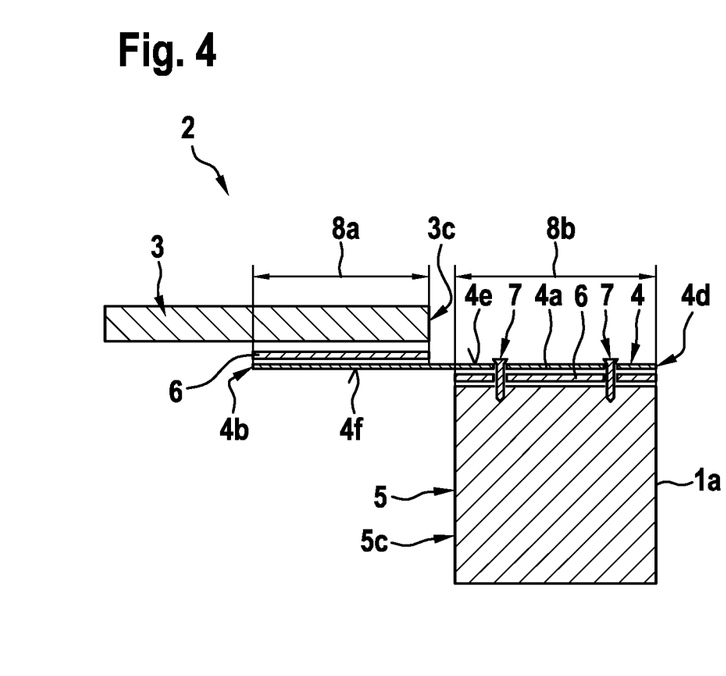
FIG. 4 shows a schematic view of a cross section along the cut line IV-IV of the vehicle of FIG. 1.

FIG. 4 shows the vehicle frame 1a of FIG. 2 and the windshield assembly 2 of FIG. 2 with the windshield 3 and the flexible element 4. As described above with reference to FIG. 2, the windshield 3 is preferably bonded to the surface 4e of the plate-type element 4a that implements the flexible element 4 by means of the adhesive layer 6, and the surface 4f of the plate-type element 4a that implements the flexible element 4 is preferably bonded to the vehicle frame 1a by means of the other adhesive layer 6.

However, in contrast to FIG. 2 the flexible element 4 is now further attached to the vehicle frame 1a by means of the at least one associated fastener 7 of FIG. 3, such as e. g. a screw, rivet or bolt. In other words, the at least one associated fastener 7 is used in addition to the other adhesive layer 6 that attaches the flexible element 4 to the vehicle frame 1a.

Figure 5:
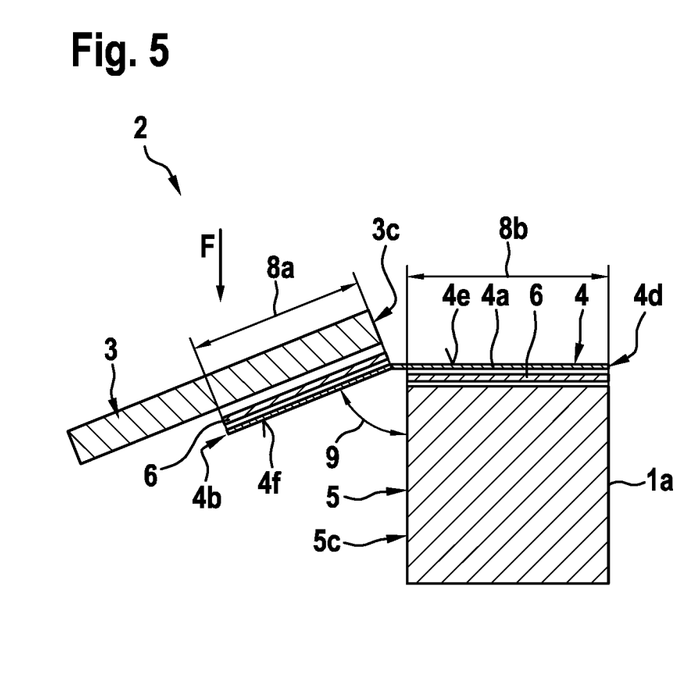
FIG. 5 shows the schematic view of FIG. 4 in an exemplary impact situation.

FIG. 5 shows the vehicle frame 1a of FIG. 2 and the windshield assembly 2 of FIG. 2 with the windshield 3 and the flexible element 4 upon occurrence of an impact on the windshield 3. For instance, the impact may result from a foreign object impact, such as e. g. a bird strike or a drone strike. An arrow F represents a respective impact force associated with the impact.

Upon occurrence of the impact, the flexible element 4 preferably experiences a deformation that preferentially allows to absorb a respective impact energy at least partly. Illustratively, the flexible element 4 acts as a hinge such that the windshield 3 pivots at least sectionally around the vehicle frame 1a with a respective angle 9. As a respective pivotal movement preferably results from a deformation of the flexible element 4, the angle 9 is also referred to as the "deformation angle 9" and it indicates an inclination of the windshield 3 relative to the vehicle frame 1a by means of the pivotal movement.

Illustratively, the pivotal movement resp. the deformation occurs in the free space located between the overlap areas 8a, 8b. This deformation preferably and advantageously affects only the flexible element 4, embodied as a hinge element, which preferentially deforms plastically.

It is preferred that the plastic deformation is non-destructive. However, dependent on the impact force F some damage, such as e. g. deterioration such as occurrence of a waviness of the flexible element 4, may occur. Alternatively, the deformation may also at least partly be elastically, dependent on the material that is selected for implementation of the flexible element 4 and e. g. in comparatively small impact scenarios.

However, any damage to the vehicle frame 1a itself or to the attachment of the vehicle frame 1a to the flexible element 4 and of the latter to the windshield 3 should preferably be avoided, at least in a wide range of impact cases. In other words, it is acceptable if e. g. small ruptures of the flexible element 4 occur in comparatively heavy impact scenarios.

Figure 6:
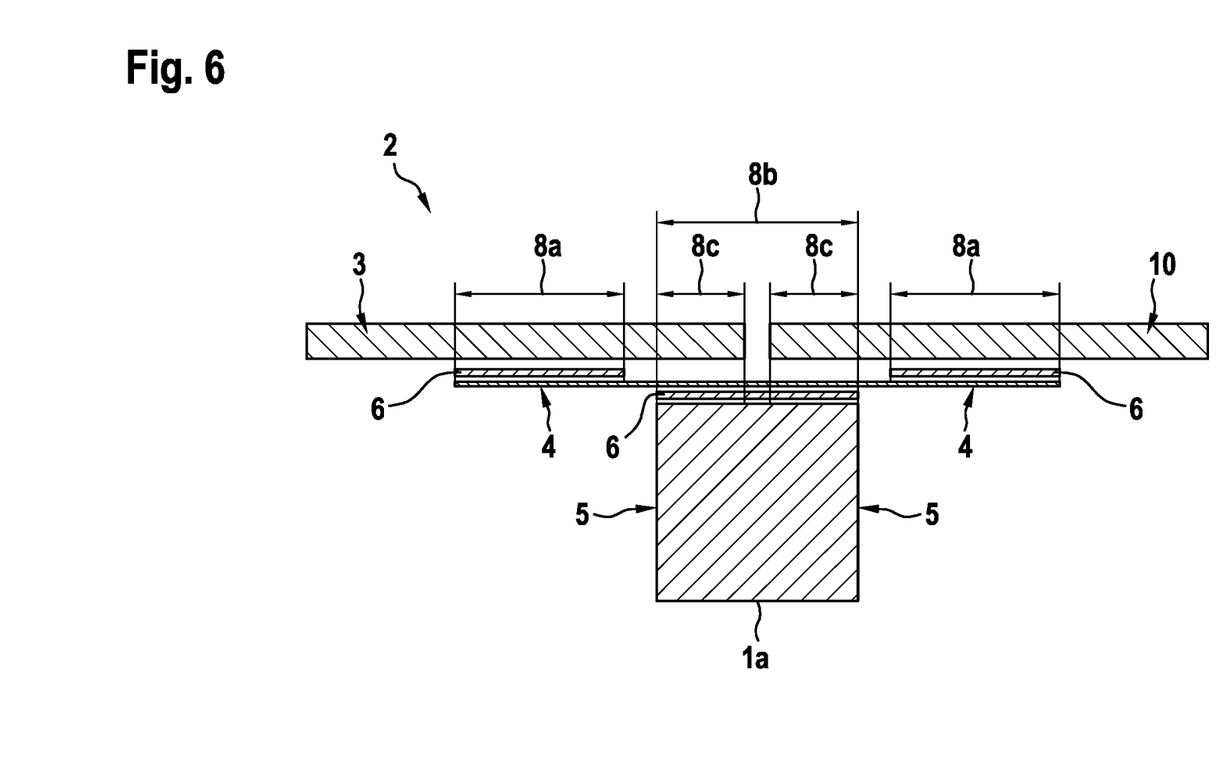
FIG. 6 shows the schematic view of FIG. 2 according to a variant of the present invention.

FIG. 6 shows the vehicle frame 1a of FIG. 2 and the windshield assembly 2 of FIG. 2 with the windshield 3 and the flexible element 4. As described above with reference to FIG. 2, the windshield 3 is preferably bonded to the flexible element 4 by means of the adhesive layer 6, and the flexible element 4 is preferably bonded to the vehicle frame 1a by means of the other adhesive layer 6.

However, in contrast to FIG. 2 the flexible element 4 is now illustratively extended beyond the vehicle frame 1a and also attached to another windshield 10. According to one aspect, the other windshield 10 is bonded to the flexible element 4 by means of still another adhesive layer which is also referred to with the reference sign 6, for simplicity and clarity. This still another adhesive layer 6 is preferably also at least partially realized by a soft glue, such as e. g. a PU glue.

Similar to the windshield 3, as explained above with reference to FIG. 2, the windshield 10 is bonded to the flexible element 4 in an area having the length 8a. This area, thus, defines an overlap area in which the windshield 10 and the flexible element 4 overlap. This overlap area is hereinafter also referred to as the "overlap area 8a".

In contrast to FIG. 2, however, the windshield 3 now overlaps the vehicle frame 1a in an area having a length 8c. This area, thus, defines an overlap area in which the windshield 3 and the vehicle frame 1a overlap. This overlap area is hereinafter referred to as the "overlap area 8c". This applies likewise to the windshield 10, which also illustratively overlaps the vehicle frame 1a in a respective overlap area 8c.

According to one aspect, the windshields 3, 10 are in the respective overlap areas 8c neither attached to the flexible element 4, nor to the vehicle frame 1a. Thus, the pivotal movement of the windshield 3 as described above with reference to FIG. 5, and likewise of the windshield 10, is not affected by the overlap areas 8c.

Figure 7:
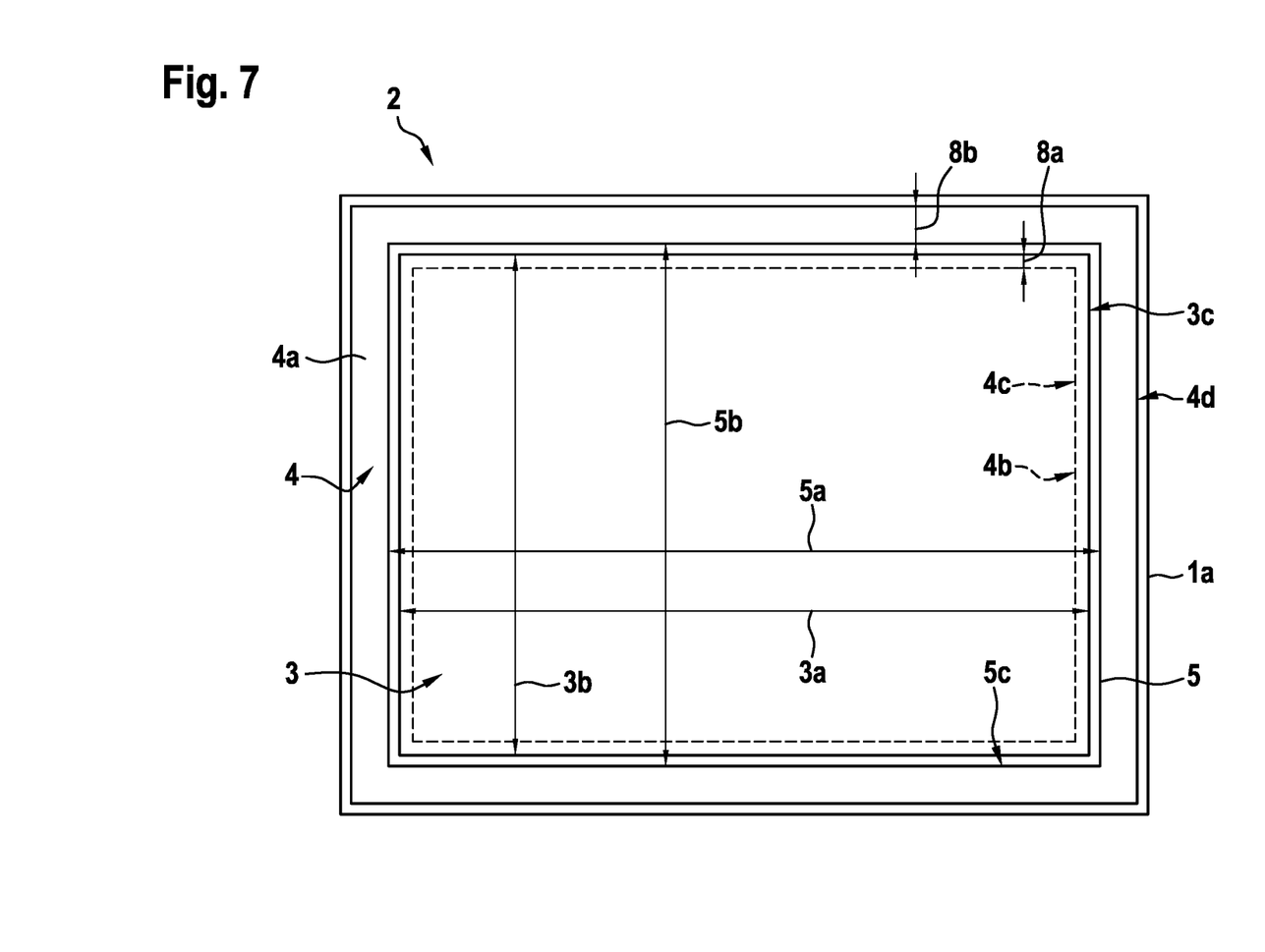
FIG. 7 shows a schematic view of the windshield assembly of FIG. 1.

FIG. 7 shows the vehicle frame 1a of FIG. 1 and the windshield assembly 2 of FIG. 2 to FIG. 5 with the windshield 3 and the flexible element 4. For describing an illustrative mounting of the windshield assembly 2 to the vehicle frame 1a, all elements are exemplarily illustrated with a flat rectangular base structure, for simplicity and clarity of the drawing and the description.

As described above, the flexible element 4, which is exemplarily embodied as the plate-type element 4a, is attached to the vehicle frame 1a. Between the plate-type element 4a and the vehicle frame 1a the overlap area 8b is formed. The length resp. width 8b of the overlap area 8b is defined by the outer circumference 4d of the plate-type element 4a and the opening inner circumference 5c of the vehicle frame 1a. The opening inner circumference 5c is illustratively defined by a respective opening length 5a and opening height 5b.

Furthermore, as also described above, the flexible element 4 is attached to the windshield 3. Between the windshield 3 and the flexible element 4 the overlap area 8a is formed. The length resp. width 8a of the overlap area 8a is defined by the windshield outer circumference 3c and the inner opening circumference 4c of the plate-type element 4a. The windshield outer circumference 3c is illustratively defined by a respective windshield length 3a and windshield height 3b.

Preferably, the inner opening circumference 4c is smaller than the windshield's outer circumference 3c. Furthermore, the flexible element's outer circumference 4d is preferentially greater than the opening inner circumference 5c of the associated opening 5 of the vehicle frame 1a.

Finally, it should be noted that modifications to the above-described exemplary implementations of the present invention are also within the common knowledge of the person skilled in the art and, thus, also considered as being part of the present invention.

For instance, the flexible element 4 is described above as a plate-type element which is according to one aspect embodied in the form of a picture frame-like component. However, the present invention is not restricted to such an implementation and a given windshield assembly may also be provided with several independent strip-like flexible elements, which may still be embodied as plate-type elements, resp. as flat and comparatively thin elements.

Furthermore, the flexible element must not necessarily be energy absorbing as such. In fact, it may be sufficient that the flexible element simply transfers occurring impact energy from the windshield to the vehicle frame.

REFERENCE LIST 1 vehicle
1a vehicle frame
2 windshield assembly
3 windshield
3a windshield length
3b windshield height
3c windshield outer circumference
4 flexible element
4a plate-type element
4b plate-type element inner opening
4c inner opening circumference
4d plate-type element outer circumference
4e windshield-side surface of plate-type element
4f vehicle frame-side surface of plate-type element
5 opening
5a opening length
5b opening height
5c opening inner circumference
6 adhesive layer
7 fastener
8a overlap between the windshield and the flexible element
8b overlap between the flexible element and the vehicle frame 8c overlap between the windshield and the vehicle frame
9 deformation angle
10 windshield
F Force

What is claimed is:

1. A vehicle comprising:
a vehicle frame having an opening, and
a windshield assembly mounted to the vehicle frame, the windshield assembly closing the opening in the vehicle frame,
the windshield assembly comprising a flexible element and a windshield, the flexible element attached to the windshield and extending between and connecting the windshield to the vehicle frame for absorbing loads resulting from an impact on the windshield, the windshield being bonded to the flexible element at a first overlap area and the flexible element being bonded to the vehicle frame at a second overlap area such that the flexible element has a free space that is not bonded to the windshield or the vehicle frame, the free space of the flexible element extending between the first and second overlap areas, the flexible element pivotally connecting the windshield to the vehicle frame such that the windshield is pivotal relative to the vehicle frame by flexure of the flexible element upon occurrence of an impact on the windshield such that the flexible element defines within the free space of the flexible element a hinge between the vehicle frame and the windshield, the flexible element is an entirely flat, plate-type element defining a frame comprising an inner opening and an outer circumference, wherein the windshield and the vehicle frame are arranged on opposite surfaces of the flexible element, wherein the windshield overlaps the vehicle frame in a respective overlap region without being attached to either of the flexible element or the vehicle frame in the respective overlap region, wherein in non-excessive load cases occurring during foreign object impact, the flexible element is movable inwardly, and back outwardly, relative to the frame, without breaking.

2. The vehicle of claim 1,
wherein the inner opening of the at least one flexible element has a circumference that is smaller than the outer circumference of the at least one windshield, wherein the outer circumference of the at least one flexible element is greater than an inner circumference of the opening of the vehicle frame.

3. The vehicle of claim 1,
wherein the at least one flexible element comprises a fiber reinforced polymer and/or metal.

4. The vehicle of claim 1,
wherein the at least one flexible element is bonded to the vehicle frame at the second overlap area by means of at least one adhesive layer.

5. The vehicle of claim 1,
wherein the at least one flexible element is attached to the vehicle frame by means of at least one fastener.

6. The vehicle of claim 1,
wherein the at least one windshield comprises thermoplastic material.

7. The vehicle of claim 1,
wherein the at least one windshield comprises polycarbonate.

8. The vehicle of claim 1,
wherein the at least one windshield has a curvature in at least one direction.

9. The vehicle of claim 1,
wherein the vehicle frame comprises composite material.

10. The vehicle of claim 1,
wherein the vehicle frame comprises a fiber reinforced polymer material.

11. The vehicle of claim 1,
wherein the windshield is bonded to the flexible element in the first overlap area by a first adhesive layer; and wherein the vehicle frame is bonded to the flexible element in the second overlap area by a second adhesive layer.

12. The vehicle of claim 1,
wherein the flexible element is bonded to a bottom surface of the windshield in the first overlap area and to an upper surface of the vehicle frame in the second overlap area.

13. A helicopter comprising:
a helicopter frame having an opening, and
a windshield assembly mounted in the opening to the helicopter frame closing the opening,
wherein the windshield assembly comprises a flexible hinge and a windshield, the flexible hinge attached to and pivotally connecting the windshield to the helicopter frame for absorbing loads resulting from an impact on the windshield, the flexible hinge pivotally connecting the windshield to the helicopter frame such that the windshield is pivotal relative to the helicopter frame between a first and a second position by movement of the flexible hinge between the first and second positions upon an impact on the windshield such that the windshield is at a different angle relative to the helicopter frame when in the first position relative to the second position, and wherein the flexible hinge is an entirely flat, plate-type element having four sides connected to each other defining the plate-type element, the flexible hinge comprising an inner opening and an outer circumference, wherein the windshield and the helicopter frame are arranged on opposite surfaces of the flexible hinge, wherein the windshield overlaps the helicopter frame in a respective overlap region without being attached to either of the flexible hinge or the helicopter frame in the respective overlap region, wherein in non-excessive load cases occurring during foreign object impact, the flexible hinge is movable inwardly, and back outwardly, relative to the frame, without breaking.

14. The helicopter of claim 13,
wherein the windshield is bonded to the flexible hinge by a first adhesive layer and wherein the helicopter frame is bonded to the flexible hinge by a second adhesive layer.

15. The helicopter of claim 13,
wherein the inner opening of the flexible hinge has a circumference that is smaller than the outer circumference of the windshield, wherein the outer circumference of the flexible hinge is greater than an inner circumference of the opening of the helicopter frame.

16. The helicopter of claim 13,
wherein the flexible hinge comprises a fiber reinforced polymer and/or metal.

17. The helicopter of claim 13,
wherein the windshield comprises thermoplastic material.

18. The helicopter of claim 13,
wherein the windshield comprises polycarbonate.

19. The helicopter of claim 13, wherein the windshield has a curvature in at least one direction.

20. The helicopter of claim 13, wherein the helicopter frame comprises composite material.

* * * * *